(12) United States Patent
Voets

(10) Patent No.: US 6,264,459 B1
(45) Date of Patent: Jul. 24, 2001

(54) MULTIPLE INJECTION MOULDING UNIT

(75) Inventor: Martinus Henricus Joseph Voets, Eindhoven (NL)

(73) Assignee: Axxicon Moulds Eindhoven B.V. (NL)

( * ) Notice: Subject to any disclaimer, the term of this patent is extended or adjusted under 35 U.S.C. 154(b) by 0 days.

(21) Appl. No.: 09/469,047

(22) Filed: Dec. 21, 1999

(30) Foreign Application Priority Data

Dec. 22, 1998 (NL) .................................................. 1010869

(51) Int. Cl.$^7$ ............................. B29C 45/26; B29C 45/27
(52) U.S. Cl. ......................... 425/548; 425/553; 425/567; 425/572; 425/588; 425/810; 264/106; 264/163
(58) Field of Search ................................. 425/547, 548, 425/553, 567, 568, 572, 588, 810; 264/106, 107, 154, 163

(56) References Cited

U.S. PATENT DOCUMENTS

| | | | | |
|---|---|---|---|---|
| 4,212,624 | * | 7/1980 | Ando et al. ......................... | 425/548 |
| 4,971,548 | | 11/1990 | Asai ..................................... | 425/588 |
| 5,238,393 | * | 8/1993 | Kishi ................................... | 425/572 |
| 5,648,105 | * | 7/1997 | Shimazu et al. ..................... | 425/139 |
| 5,792,493 | * | 8/1998 | Gellert ................................. | 425/567 |

FOREIGN PATENT DOCUMENTS

| | | | |
|---|---|---|---|
| 0051253 | 5/1982 | (EP) .............. | B29F/1/022 |
| 0567682 | 11/1993 | (EP) .............................. | B29C/45/26 |
| 05220778 | 12/1993 | (JP) .............................. | B29C/45/03 |
| 07227883 | 12/1995 | (JP) .............................. | B29C/45/26 |

\* cited by examiner

Primary Examiner—Nam Nguyen
Assistant Examiner—Donald Heckenberg
(74) Attorney, Agent, or Firm—Webb Ziesenheim Logsdon Orkin & Hanson, P.C.

(57) ABSTRACT

An injection moulding unit includes at least two injection moulds for manufacturing disc-like objects. The injection moulds each further include two mould parts which are mutually displaceable between a closed position in which they bound a mould cavity and an opened position in which the disc-like object can be removed. The mould cavity is connected to a pressure line for carrying heated plastic into the mould cavity. A punching means is provided for punching a central hole through the disc-like object. The punching means includes a cylindrical part forming a portion of one of the mould parts and has a leading peripheral edge. The respective pressure lines of the injection moulds are branches of a feed line and together therewith form part of a collective multiple hot runner. The outlet zone of each feed line is configured to couple to an infeed of an injection bush. An outfeed of the injection bush debouches directly into the mould cavity. The hot runner is coupled by a spring device to a connecting piece of thermally conductive material. The connecting piece is fixedly connected to the respective injection bushes. A tempering device is provided to hold the temperature of the connecting piece within predetermined limits.

5 Claims, 2 Drawing Sheets

MULTIPLE INJECTION MOULDING UNIT

BACKGROUND OF THE INVENTION

Field of the Invention

The present invention lies in the field of manufacturing disc-like plastic objects, for instance information carriers such as CDs. A two-fold injection moulding unit is known for this purpose. This injection moulding unit comprises two injection moulds coupled mechanically to each other. Via a multiple hot-runner beam the unit is fixed rigidly against a front plate by means of bolts such that the injection buses debouching with a passage in the respective mould cavities are enclosed between the two, such that the central hole of a disc-like object is formed by retracting a punch. This requires an expensive and time-consuming construction, wherein movable wedges are placed behind the punch to hold the punch in place when it is loaded with a high injection pressure during the injection of plastic.

It is comparatively simple to form the central hole in a disc by means of a punch. The drawback hereof is that this requires an injection bush having to be moved aside for the purpose, which is awkward because an injection bush is connected by means of bolts to said hot runner beam. This combination will thus have to be able to move during punching and be in fixed position during injection. The injection bushes are guided in a guide formed by a front block. This block is cooled from 120° C. to 50° C. The hot runner temperature amount to about 350° C. As a consequence the hot runner therefore expands much more than the front block and, because the injection bushes are fixed to the hot runner with bolts, they will be clamped fixedly on one side by expansion of the hot runner. It is an object of the invention to provide a solution to this problem. A further object of the invention is to provide an injection moulding unit enabling a simpler and less expensive structure.

SUMMARY OF THE INVENTION

The invention now provides an injection moulding unit comprising at least two injection moulds for manufacturing in each case successive disc-like objects, in particular disc-like information carriers such as CDs, which injection moulds each comprise:

at least two mould parts which are mutually displaceable between a closed position, in which they bound a mould cavity, which mould cavity is connected to a pressure line for carrying heated plasticized plastic under pressure into this mould cavity, and an opened position in which a disc-like object can be removed; and punching means for punching a central hole from a disc-like object, which punching means comprise a cylindrical part forming part of the one mould part and having a leading peripheral edge with a form adapted to the shape of the hole to be punched from a disc-like object, which part is axially movable from and to the other mould part;

wherein the respective pressure lines of the moulds are branches of a feed line and together therewith form part of a collective multiple hot runner, wherein the inlet zone of the feed line is adapted for coupling to the outfeed of a plastic-plasticizing and pressing device;

wherein the outlet zone of each feed line is adapted for coupling to the infeed of an injection bush, the outfeed of which debouches directly into the mould cavity;

wherein the hot runner is coupled by means of spring means to a connecting piece of thermally conductive material, which connecting piece is fixedly connected to the injection bushes; and wherein tempering means are present for holding the temperature of the connecting piece within predetermined limits.

The hole in the disc-like object is made by means of a punch. The combination of injection bush and hot runner has to move aside for this purpose. This takes place by making use of spring means connected to this combination. In order to prevent the injection bushes becoming jammed in the block when the hot runner beam expands, the invention provides a construction which ensures that the injection bushes are held in place. This takes place by making use of the connecting piece. This connecting piece is fixedly connected to the injection bushes by for instance bolts. The connecting piece must be tempered in order to function properly. This tempering can take place by heat transfer via radiation from the block, heat conduction via the block, by making use of cooling channels in the block, with electrical Peltier elements or other suitable ways of holding the connecting piece at the same temperature as the block, at least within certain tolerance limits.

Heat transfer can also take place via springs placed between the connecting piece and front block, while the connecting piece can be guided in axial direction relative to the front block by means of a central guided pin, which likewise provides transfer.

It is of further importance to shield the heat coming from the hot runner. Use can be made to this end of a plate of insulation material between hot runner and connecting piece. Further use can optionally also be made of for instance a reflective layer, consisting for instance of mirrored aluminium.

The contact surfaces between injection bushes and hot runner can be insulated, for instance by means of ceramic rings.

Forward movement of the hot runner takes place under the influence of the pressure applied by the injection nozzle, i.e. the outfeed of the plastic-plasticizing and pressing device used. It is therefore important that this injection nozzle can move back during punching of the hole in the disc. The backward movement takes place over a slight distance such that the contact with the hot runner beam is maintained. Leakages and air inclusions are hereby effectively prevented.

Essential for the invention is the use of the resiliently arranged hot runner. Also of essential importance is the connecting pieces of thermal material between the injection bushes and the use of tempering means to keep the connecting piece at a desired temperature. It is of further importance that this connecting piece be held in place by for instance a guide pin which can be arranged fixedly in the front block and over which the connecting piece can slide via a fitting. This pin ensures that the injection bushes remain precisely in the middle of their guide. Said tempering of the connecting piece ensures that the injection bushes follow precisely the thermal expansion of the front plate.

Attention is drawn to the European patent EP-B-0 567 682. This publication discloses a double injection mould with only one movable hot runner without further moving components. The combination according to the invention cannot be derived from this older European specification.

The invention will now be elucidated with reference to the annexed figures.

DETAILED DESCRIPTION OF THE PREFERRED EMBODIMENTS

Figure 1:
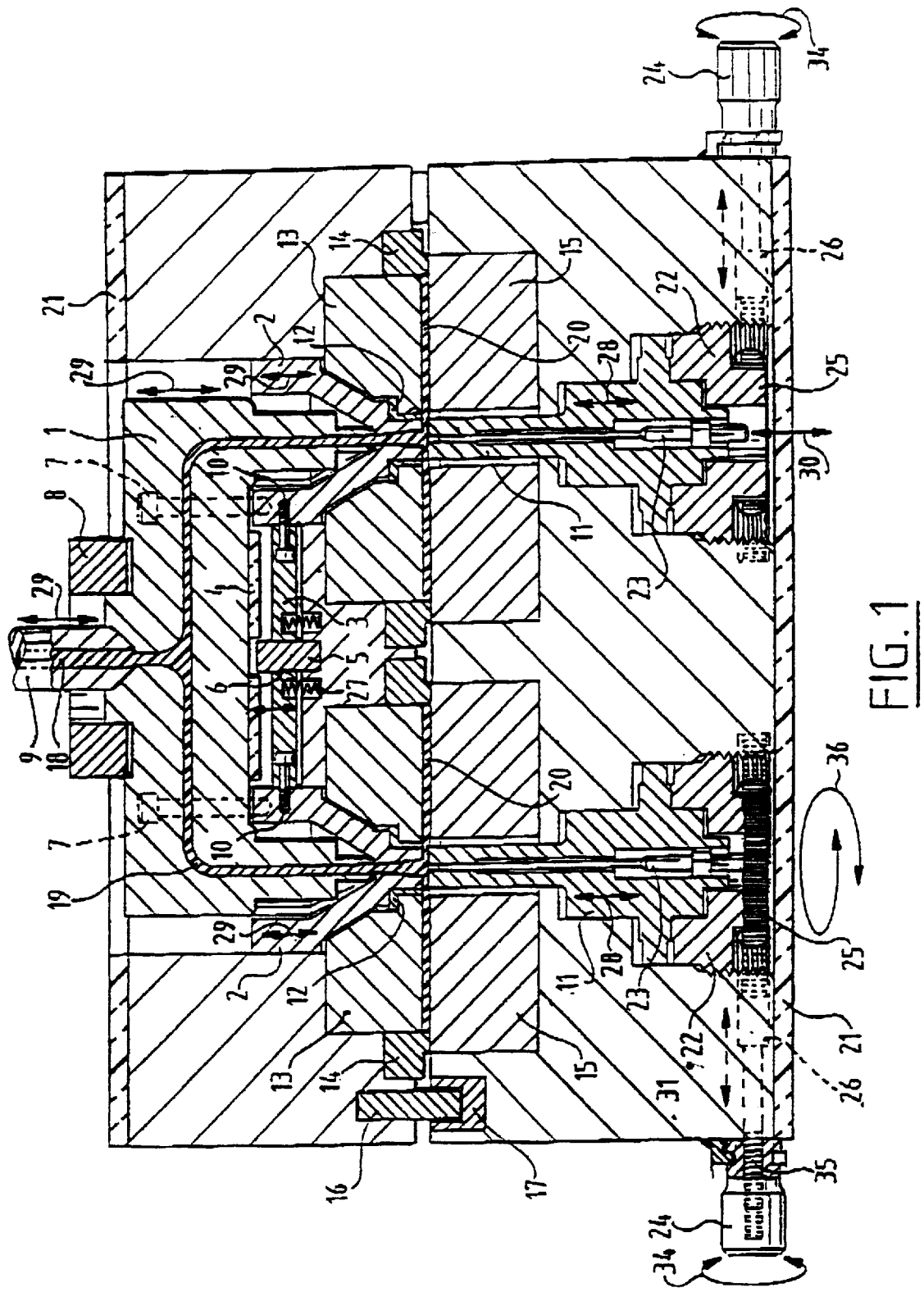
FIG. 1 shows a section through a two-fold injection moulding unit with two injection moulds and a resilient hot runner for the purpose of punching out the sprue film of a manufactured plastic disc.

In the drawings the reference numerals designate components in accordance with the following list:

1=multiple hot runner
2=injection bush
3=connecting piece between injection bushes 2
4=insulating plate of epoxy material reinforced with glass fibre, and aluminium heat shield which is reflective for the relevant temperature
5=centring pin for connecting piece
6=slide surface of centring pin along which connecting piece can slide
7=connecting bolts between hot runner and injection bushes
8=positioning ring, also stop hot runner
9=injection nozzle of plastic-plasticizing and pressing device
10=connecting bolts between connecting piece and injection bushes
11=punch
12=die
13=fixedly disposed mirror plate, i.e. a plate of which a flat surface forms a boundary of mould cavity 20
14=ventilation ring
15=displaceable mirror plate
16=male centring element for fixed mould half, i.e. the mould half on the side of plate 13
17=female centring element on displaceable mould half
18=feed line for heated plasticized plastic (polycarbonate) in injection nozzle 9
19=pressure line in hot runner 1, branch of feed line which connects to line 18 for supply of plasticized plastic to mould cavities 20
20=disc-shaped mould cavity for manufacturing for instance CD-audio, CD-ROM, DVD, CD RW or the like
21=insulation plate
22=covering for punch
23=ejector
24=control knob for adjusting retracted position of the punch
25=transmission gear of punch
26=gear rack
27=compression springs for displacing hot runner, injection bush and connecting piece
28=arrow
29=arrow
30=arrow
31=arrow
32=hole
33=hole
34=arrow
35=arrow
36=arrow
37=screw thread part
38=annular surface FIG. 1 shows the application of the device in a multiple mould. Since in terms of basic structure this is of generally known and usual type, it suffices to refer to the above list of components, with some supplementary remarks as follows.

The mould takes a two-fold form and comprises in the drawn closed situation two disc-shaped mould cavities 20 for manufacture of a disc-like information carrier. Two information carriers are manufactured simultaneously in one cycle. Via the injection nozzle 9 of a plastic-plasticizing and pressing device (not shown) liquid polycarbonate is injected via line 18. Via pressure lines 19 this plasticized plastic is injected into mould cavities 20. A punching operation takes place after completion of the plastic injection and in most cases before the plastic has fully cooled. By means of drive means (not shown) an axial displacement as according to arrow 28 in the direction of line 19 takes place with simultaneous resilient displacement of injection bush 2 as according to arrow 29. Due to the coupling by means of bolts 7 the injection nozzle 9 is coupled to injection bushes 2 for axial movement as according to arrow 29.

The central part of the formed information carrier is hereby removed with the forming of a central hole. Displacement as according to arrow 30 of the central ejector 23, which extends coaxially to and through punch 20, removes the associated sprue, which is discharged as waste.

Figure 2:
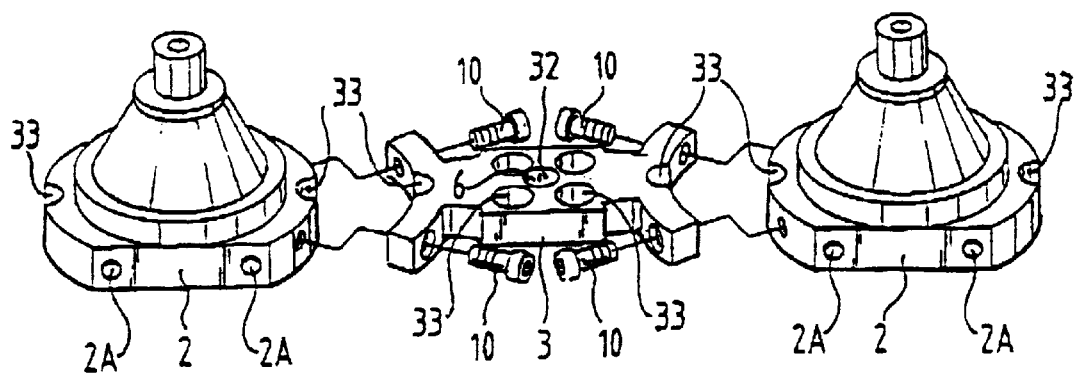
FIG. 2 shows an exploded view of two injection bushes and a connecting piece.
Figure 3:
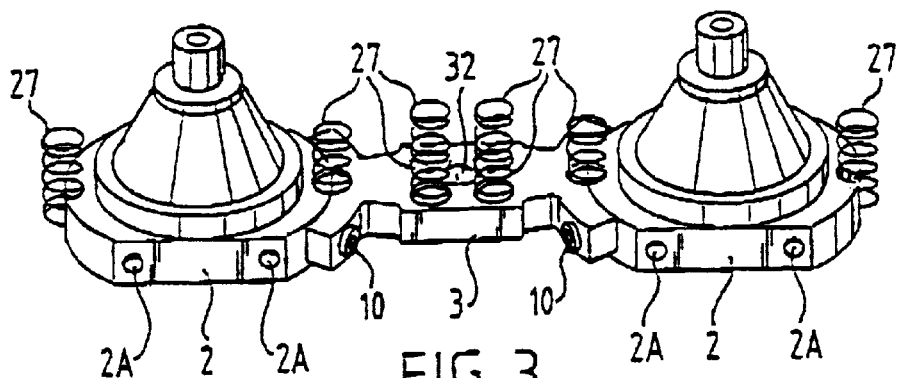
FIG. 3 is a perspective view of the components of FIG. 2 combined into the unit, which unit is also provided with springs to bring about co-displacement of the unit with the hot runner.

The connecting piece 3 between injection bushes 2 shown in the respective FIGS. 2 and 3 is given a thermally conductive form, for instance of copper, whereby a good thermally conductive contact between injection bushes 2 is ensured. FIG. 2 shows the method of coupling, wherein use is made of connecting bolts 10.

The coupled unit 2, 3, 2 of FIG. 3 is positioned relative to multiple hot runner 1 by means of centring pin 5 which extends through hole 32 in connecting piece 3 and also serves as heat-conducting bridge. Compression springs 27 are accommodated in continuous holes and recesses, all designated 33. These are shown clearly in FIG. 2, while FIG. 3 shows the configuration with placed compression springs 27.

Pin 5 slides along the inner surface 6 of continuous hole 32.

The insulating plate 4 also serves to provide a good thermal management and a properly controlled tempering of unit 2, 3, 2 as according to FIG. 3.

As already described above, it is important according to the invention to prevent the injection bushes becoming jammed in their guide when the hot runner beam expands. Connecting piece 3 fulfills a very important thermal function in this respect. It must be tempered. This can take place by heat transfer via radiation from hot runner block 1, by heat conduction via hot runner 1, by making use of cooling channels in the block, with electrical Peltier elements (not shown) or other methods serving to keep the connecting piece at the same temperature as hot runner 1. As will become apparent, this measure achieves that injection bushes 2 are held at practically the same temperature as their (narrow) guides, so that there need be no fear of jamming, even in the case of temperature variations. In the present case the heat transfer in question takes place via inter alia springs 27 and the centring and guiding pin 5. Shielding of the heat coming from hot runner 1 takes place with insulation plate 4 which in this embodiment is also provided with a mirrored aluminium reflective layer. The contact surfaces between injection bushes 2 and hot runner 1 are also insulated by means of ceramic rings. Forward movement of hot runner 1 takes place by means of the forward pressure force exerted by injection nozzle 9. It is therefore important that this injection nozzle 9 can move backward during punching of the hole in the formed information carrier. However, this movement is so slight that contact with hot runner 1 is maintained. Leakage and the forming of air inclusions is thus prevented. Essential for the invention is the resiliently disposed hot runner in combination with the connecting piece 3 between injection bushes 2, and the tempering of connecting piece 3. It is of further importance that connecting piece 3 is held precisely in position by pin 5 which is received fixedly in the front block and over which connecting piece 3 can slide. The described structure results in a tempering of connecting piece 3 and therewith the unit 2, 3, 2, whereby injection bushes 2 follow precisely the expansion of the front plate.

Figure 4:
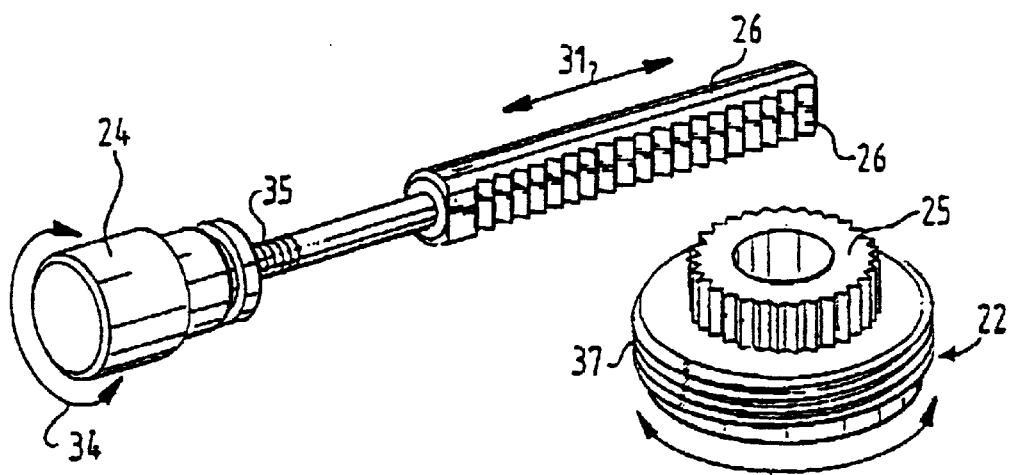
FIG. 4 shows adjusting means enabling control from outside of the rest position of the punch.

FIG. 1 and FIG. 4 show the axial adjustability of punch 11. Through rotation as according to arrow 34 the gear rack 26 locked against rotation can be axially displaced via a screw coupling 35 as according to arrow 31 by control knob 24. Rotation of transmission gear 26 hereby takes place as according to arrow 36, which as a result of this rotation can undergo an axial displacement with a screw thread part 37 as according to arrow 28.

The annular surface 38 of FIG. 4 forms a stop for the punch during the injection of plastic. The inflow opening of the relevant mould can be adjusted by adjusting this stop by means of gear rack 26. This is important for a good process control.

Attention is drawn to the fact that FIG. 1 is incomplete in the sense that it does not show the manner in which the double mould is opened and closed. In addition, operating means for operating punches and ejectors and the like are not shown.

What is claimed is:

1. An injection moulding unit, comprising:
    at least two injection moulds for manufacturing successive disc-shaped objects, wherein the injection moulds each comprise:
        at least two mould parts which are mutually displaceable between a closed position in which the at least two mould parts bound a mould cavity and an opened position in which the disc-shaped object is removable, wherein the mould cavity is connected to a pressure line for carrying heated plasticized plastic under pressure into the mould cavity; and
        punching means for punching a central hole through the disc-shaped object, wherein the punching means includes a cylindrical part forming a portion of one of the at least two mould parts and having a leading peripheral edge with a form configured to cooperate with the central hole through the disc-shaped object;
    wherein the cylindrical part is axially movable toward and away from the other of the at least two mould parts;
    wherein the pressure line for each of the injection moulds is a branch of a feed line and together therewith form part of a collective multiple hot runner, wherein an inlet zone of the feed line is configured to couple to an outfeed of a plastic-plasticizing and pressing device;
    wherein an outlet zone of the feed line is configured to couple to an infeed of an injection bush, wherein the injection bush includes an outfeed which debouches into the mould cavity;
    wherein the hot runner is coupled by spring means to a connecting piece of thermally conductive material, wherein the connecting piece is fixedly connected to the injection bush; and
    wherein the connecting piece includes tempering means for holding temperature of the connecting piece within predetermined limits.

2. The injection moulding unit as claimed in claim 1, wherein the spring means is connected between the connecting piece and the mould parts through which the respective injection bushes extend.

3. The injection moulding unit as claimed in claim 1, further including adjusting means for adjusting a distance between the leading peripheral edge of the cylindrical part and a mould surface of the other mould part.

4. The injection moulding unit as claimed in claim 3, wherein the adjusting means is remotely operated.

5. The invention moulding unit as claimed in claim 1, wherein a wall of the mould cavity located opposite the debouchment of the pressure line defines a central recess narrowing towards the mould cavity, and wherein a bottom of the central recess is formed by an end surface of an ejector configured to eject a part separated from the disc-shaped object during the punching of the central hole.

* * * * *

UNITED STATES PATENT AND TRADEMARK OFFICE
CERTIFICATE OF CORRECTION

PATENT NO.    : 6,264,459 B1
DATED         : July 24, 2001
INVENTOR(S)   : Martinus Henricus Joseph Voets It is certified that error appears in the above-identified patent and that said Letters Patent is hereby corrected as shown below:

Column 1,
Line 4, "Field of Invention" should read -- 1. Field of the Invention --.
Line 7, after "such as CDs." start new paragraph with the following heading:
  -- 2. Description of the Prior Art --
Line 11, "buses" should read -- bushes --.

Column 2,
Line 47, "connecting pieces" should read -- connecting piece --.
Line 65, "DRAWING" should read -- DRAWINGS --.

Column 5,
Line 28, "gear 26" should read -- gear 25 --.

Signed and Sealed this

Twenty-ninth Day of January, 2002

*Attest:*

JAMES E. ROGAN
*Attesting Officer*   *Director of the United States Patent and Trademark Office*